United States Patent [19]

North et al.

[11] 3,862,285

[45] Jan. 21, 1975

[54] PRODUCTION OF THERMOPLASTIC SHEET

[75] Inventors: Howard C. North, Baytown, Tex.; Harry W. Sherman, Palatine, Ill.; Edward B. Kaplan, Springfield, N.J.

[73] Assignee: Esso Research and Engineering Company, Linden, N.J.

[22] Filed: Sept. 13, 1972

[21] Appl. No.: 288,485

Related U.S. Application Data

[62] Division of Ser. No. 134,598, April 16, 1971, Pat. No. 3,717,425.

[52] U.S. Cl. ............... 264/89, 264/95, 264/180, 264/237, 264/348, 425/67
[51] Int. Cl. ............... B29d 7/20, B29c 17/00
[58] Field of Search ............... 264/89, 95, 90, 176 R, 264/178 R, 180, 40, 181, 169, 237, 40, 348, 210 R; 425/71, 67, 69, 320 R

[56] References Cited
UNITED STATES PATENTS

| | | | |
|---|---|---|---|
| 3,199,148 | 8/1965 | Koppehele | 264/180 |
| 3,295,163 | 1/1967 | Bachus | 264/348 |
| 3,337,663 | 8/1967 | Taga | 425/71 |
| 3,344,474 | 10/1967 | Davis et al. | 264/210 R |
| 3,428,726 | 2/1969 | Moss | 264/237 |
| 3,622,657 | 11/1971 | North et al. | 264/237 |
| 3,655,846 | 4/1972 | Kanoh et al. | 264/89 |
| 3,696,184 | 10/1972 | Arnett et al. | 264/40 |

Primary Examiner—Jeffery R. Thurlow
Attorney, Agent, or Firm—N. Elton Dry; Harold N. Wells

[57] ABSTRACT

Plastic polyolefin sheets may be formed by passing extruded resin through a primary cooling zone having a moving, smooth free surface on the cooling liquid, cooling being effected by laminar flow cooling liquid and thence by turbulent flow cooling liquid.

9 Claims, 1 Drawing Figure

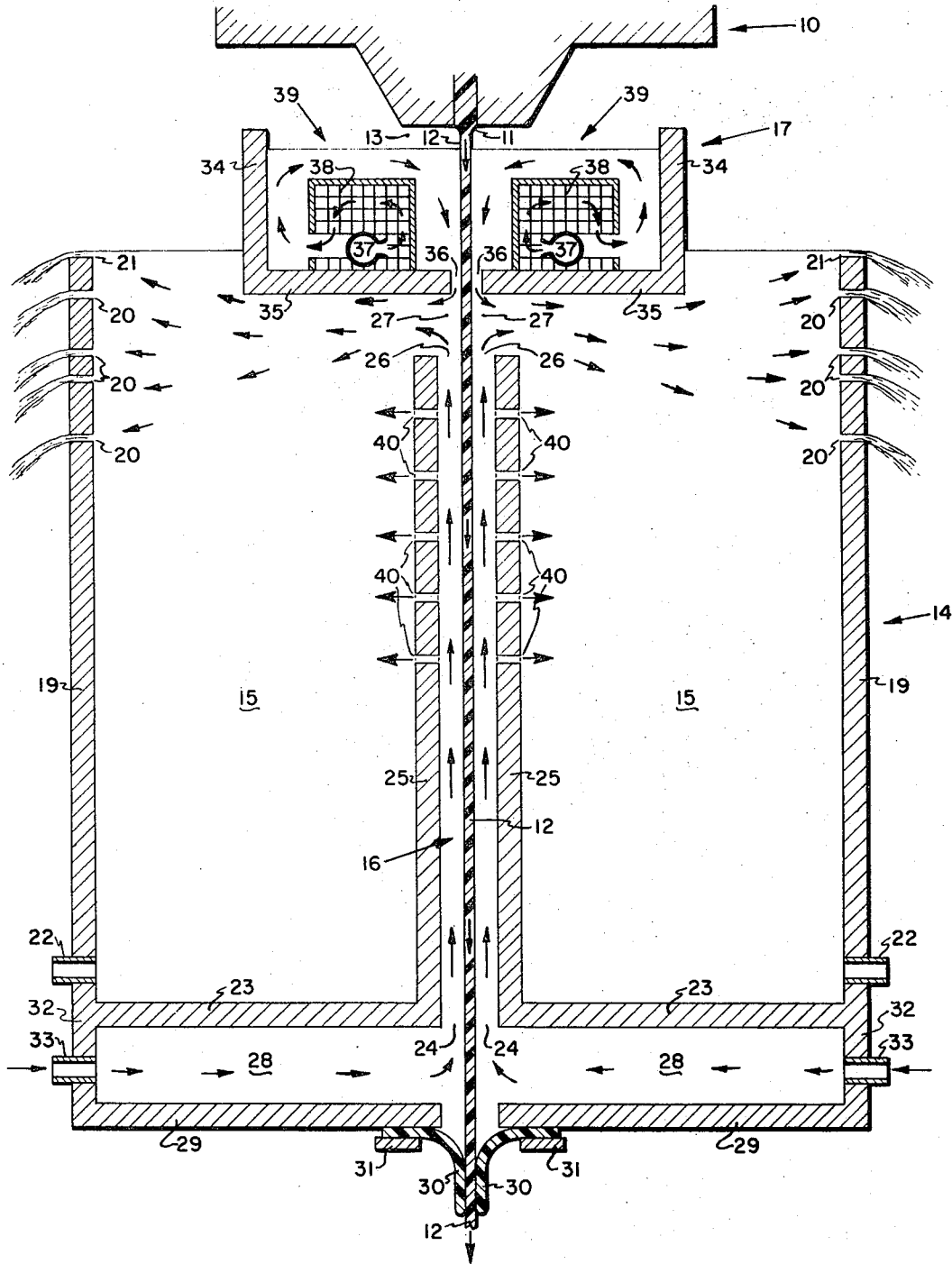

PRODUCTION OF THERMOPLASTIC SHEET

REFERENCE TO RELATED APPLICATIONS

This application is a division of Ser. No. 134,598 filed Apr. 16, 1971 issued as U.S. Pat. No. 3,717,425.

BACKGROUND OF THE INVENTION

This invention relates to a process for the formation of thermoplastic sheet. More particularly, it relates to the high speed formation of polyolefin sheet.

As is well known to those skilled in the art, thermoplastic compositions such as polyolefins (i.e. polyalkylenes) including polyethylene and polypropylene, have been formed into various structural shapes and forms. It has heretofore been common to form polypropylene sheet in particular into film by orientation, either monoaxially or biaxially, by stretching at controlled temperature; and the product film, characterized by high physical strength, clarity, high impact strength, and superior electrical properties has found application in a wide variety of end uses.

It has, however, heretofore been found that the formation of thermoplastic sheet suitable for orientation at high rates may be possible only with film or thin sheet, i.e. having a thickness less than about ten mils. Commercial production of oriented polyolefin, typically polypropylene film has included the steps of extruding a sheet of desired thickness from a charge material, normally polypropylene pellets. The sheet may be quenched from its high extrusion temperature as by contact with water or a chill roll to reduce it to desired temperature, typically 20°C. to 70°C., say 40°C. The sheet may then be heated to orientation temperature (for polypropylene) of 110°C. to 165°C., say 145°C. (for biaxial stretching) or 130°C. (for monoaxial stretching) and then be stretched either monoaxially or biaxially (simultaneously or sequentially) as desired.

Proper operation of the process requires that the extruded sheet be quenched rapidly and promptly after extrusion to minimize crystallization and with a minimum of preorientation.

It is well known that the step of quenching the heavy gauge polyolefin sheet following extrusion is rate determining. Thus, it is extremely difficult to produce heavy gauge sheet suitable for orientation, having a thickness greater than 10 mils, particularly above 15 mils, at the desired high rates of production. Accordingly, for this reason, high speed production of oriented polyolefin film of required gauge and degree of orientation (i.e. stretch ratio) has not heretofore been commercially possible.

It is an object of this invention to set forth a process for preparing thermoplastic sheet. Other objects will be apparent to those skilled in the art on inspection of the following description.

SUMMARY OF THE INVENTION

In accordance with certain of its aspects, the novel method of this invention for producing a thermoplastic film may comprise:

a. forming a thermoplastic resin in the form of a molten, thermoplastic sheet body;

b. passing said sheet body downwardly through cooling liquid in a primary cooling zone;

c. maintaining a moving, smooth, free surface on the cooling liquid in said primary cooling zone at the point at which said sheet body enters said primary zone;

d. withdrawing said sheet body through an exit in the lower portion of said primary cooling zone;

e. passing primary cooling liquid in cocurrent laminar flow in contact with said sheet body as it passes through said primary cooling zone;

f. withdrawing a stream of primary cooling liquid with said sheet body through said exit in said primary cooling zone;

g. passing said sheet body through a relief section, which is without a free liquid surface, in a liquid discharge zone;

h. passing said sheet body from said relief section zone into a secondary cooling zone;

i. passing secondary cooling liquid at turbulent flow countercurrent to said sheet body as it passes through said secondary cooling zone;

j. passing said turbulent flow secondary cooling liquid from said secondary zone to said relief section at a point slightly below and substantially colinear to the exit of said primary cooling zone;

k. maintaining the liquid level in said primary cooling zone by the rate of flow of said withdrawn stream of primary cooling liquid and in accordance with the flow of turbulent flow secondary cooling liquid exiting said secondary zone; and l. withdrawing said sheet body from said secondary cooling zone.

DESCRIPTION OF THE INVENTION

The thermoplastic resins which may be employed in practice of the process of this invention may typically include polyamides (e.g. nylons), polyolefins including polypropylene or low density or high density polyethylene; etc.

The polyolefin compositions which may find use in practice of this invention may include polymers including homopolymers and copolymers of alpha olefins such as ethylene, propylene, butene-1, etc. The preferred homopolymers may be polypropylene and polyethylene. The polyethylene which may be employed may preferably be high density polyethylene typically having a melting point of 127°C. to 135°C., an average density greater than about 0.92, typically 0.95 to 0.98 in its annealed state, and a degree of crystallinity of typically 80% to 90+%.

The preferred polymer which may be used in the practice of this invention may be polypropylene, typically crystalline polypropylene having an n-heptane insoluble content of 84% to 96% and a melt flow of 0.5 to 12.0. Commercial crystalline polyalkylenes, preferably polypropylene including copolymers may be employed wherein the copolymerization does not substantially interfere with the close packing of the monomers necessary to give high crystallinity.

In practice of the process of this invention to prepare a thermoplastic, e.g. polypropylene sheet having a thickness greater than about 10 mils and typically 15-60 mils, thermoplastic resin pellets may be formed into a molten thermoplastic sheet body by extrusion. The extruded sheet may be rapidly quenched to form a solid sheet body. This may be effected by extruding, as from a screw-type extruder under conditions minimizing crystallinity and pre-orientation in the sheet. Commonly, this may be achieved by extrusion at a pressure of 2000 to 6000 psig, say 4000 psig, at a temperature (for polypropylene) of 200°C. to 320°C., say 225°C., or (for polyethylene) of 150°C. to 300°C., say 200°C., or (for nylon) of 230°C. to 270°C., say 240°C.

In one illustrative mode of operation, a sheet of polypropylene (40 mils thick) having properties particularly suited for subsequent orientation to form simultaneously biaxially oriented polypropylene may be produced by feeding polypropylene pellets (having a melt flow of 5 to 7 and an n-heptane insoluble content of 92% to 95%) to a screw-type extruder. The pellets may be melted and homogenized to form a uniform melt at 200°C. to 320°C., say 225°C.; and this melt may be extruded at 2000 psig to 6000 psig, say 4000 psig.

The polypropylene melt may be formed into a molten flat sheet form by a flat die with an opening 30 to 80 mils, say 60 mils, at a typical rate of 90 pounds per hour per inch of die.

Quenching from the melt temperature, through the crystallization zone, is done in two steps — first by a relatively short, low heat transfer zone characterized by a smooth liquid surface, followed directly by a turbulent, high heat transfer zone wherein most of the heat of extrusion is removed.

The formed, molten thermoplastic sheet body exiting the extruder may be passed downwardly through an air gap into a cooling zone. Preferably, the air gap may be very short or thin, commonly having a length (i.e. height) of less than 25 mm, typically 1 mm to 10 mm, say 5 mm. It is a feature of this process that the air gap be of minimum length. The 60 mil thick thermoplastic molten resin sheet body, moving downwardly at typical velocities of 25 to 200 fpm, say 65 fpm, may pass through the air gap in 0.001 to 0.08 second, typically 0.015 second.

The sheet body may be passed from the air gap to the cooling zone wherein it may be contacted with cooling liquid, typically water, to quickly cool it to desired temperature. The sheet body first enters a primary cooling zone in which there is maintained a smooth, moving, free surface on the cooling liquid at least at the point at which the sheet body enters this zone. The primary cooling zone (and also the secondary zone and relief section noted *infra*) may include a pair of sub-zones, one on each face of the downwardly moving sheet body. Each primary cooling sub-zone may contain a liquid inlet, preferably at a lower outer portion thereof, which projects liquid through a course including a path horizontally across the upper portion of the primary cooling zone toward the point at which, i.e. the line along which, the sheet body enters the primary cooling zone. The velocity of horizontal flow across the surface may be 0.5 to 5 fpm, say 2 fpm, which is sufficiently low to maintain laminar flow and to maintain a moving, smooth, free surface on the cooling liquid at least at the point at which the sheet body enters the primary zone.

As the primary cooling liquid in the primary cooling zone approaches the downwardly moving sheet body, it is drawn along therewith in cocurrent laminar flow. The sheet body leaves the primary cooling zone through an exit in the lower portion thereof; and primary cooling liquid may pass along therewith. Typical travel of the sheet body through the primary cooling zone may be 5 cm to 15 cm, say 10 cm.

Typically, charge cooling liquid may be added to the primary zone at controlled rates at temperature of 5°C. to 80°C., say 40°C. Cooling liquid may leave the primary zone at 10°C. to 90°C., say 45°C.

The exit from the primary cooling zone may typically be 4 to 30 mm, say 8 mm greater in total width than the thickness of the sheet and the thermoplastic film body may pass therethrough. Typically, the temperature of the film body at this point may be a mean average 10°C. to 30°C., say 20°C., less than the temperature at which it entered the primary cooling zone. For polypropylene, the exit temperature at the surface of the film body may be 160°C. to 200°C., say 180°C.; at the center of the film body, the temperature may be 200°C. to 300°C., say 225°C., and at the thermal mean 180°C. to 250°C., say 210°C.

Because of the controlled relationship between the dimensions of the exit from the primary cooling zone, the length of the relief section, the flow rate in the primary zone and the velocity of secondary cooling liquid, it is possible to achieve a smooth, free surface in the primary zone and to control the level required to achieve the short air gap; and this level will be higher than the liquid level in the liquid discharge zone.

The sheet body exiting the primary cooling zone may be passed into a relief section. This relief section may be slightly below and colinear with the primary cooling zone exit; and the liquid passing through this exit may be controlled by the flow rate to the primary zone. The relief section may be a submerged zone, without a free surface, through which the cooling liquid from the primary and secondary zones leaves the face of the downwardly moving film body.

The cooling liquid may then pass into the liquid discharge zone and move laterally thereacross to be discharged therefrom through submerged openings or over a weir adjacent to the free surface of the liquid discharge zone.

The relief section is short and therefore contributes little to cooling of the sheet body. Typically, the sheet temperatures are reduced about 10% as much as they are in the primary cooling zone.

The downwardly descending sheet body may pass from the relief section into an attenuated secondary cooling zone. In this zone, the sheet body may be contacted with a stream of cooling liquid, moving at turbulent flow, which passes through the attenuated secondary cooling zone. Cooling liquid may be released from the secondary cooling zone through openings in the sides thereof which may be closed off. In this zone, the downwardly descending sheet body may pass through the crystalline point and through the temperature range in which the crystalline growth is maximum. Commonly, the cooling liquid may enter this secondary zone at 3°C. to 80°C., say 5°C. and, as it flows countercurrently to the downwardly moving sheet, it cools the thermoplastic sheet body and its temperature may rise by 0.5°C. to 5°C., say 2°C. The secondary zone may typically be an attenuated passage extending 5 to 25 mm, say 12 mm, on each side of the sheet body; and cooling liquid may pass therethrough at a velocity of 50 to 400 fpm, say 200 fpm. The effective heat transfer coefficient in the secondary or high liquid velocity cooling zone may typically be 150 to 400 BTU/hr. ft.$^2$ °F., say 300 BTU/hr. ft.$^2$ °F.

The turbulent flow secondary cooling liquid leaving the secondary cooling zone may be passed to the relief section and at a point slightly below and colinear with the exit slot from the primary cooling zone. The pressure generated by the upward jetting streams of this cooling liquid leaving the secondary zone may effect control of the static head in the primary cooling zone. The liquid level in the primary zone may also be controlled by the back pressure contributed by the liquid level in the liquid discharge zone, by the velocity components of the cooling liquid as it moves across the relief section, by the width of the restrictor exit slot in the primary cooling zone, and by the liquid flow rate to the primary cooling zone. The liquid outlets for liquid leaving the liquid discharge zone preferably include a plurality of openings or relief ports in the outer walls and a top weir.

The downwardly moving sheet body may leave the secondary cooling zone after a typical travel therein of 0.2 to 2 meters, say 0.6 meters over 0.2 to 15 seconds, say 1.2 seconds. As the sheet body leaves the secondary cooling zone (at a surface temperature of 4°C. to 50°C., say 40°C., a central temperature of 80°C. to 150°C., say 120°C. and a thermal mean temperature of 50°C. to 130°C., say 90°C.), it may be contacted with fresh secondary cooling liquid.

Preferably, the sheet body, after leaving the secondary cooling zone, may pass through a plenum zone and then leave the cooling system through a seal.

It is a particular feature of the novel process of this invention that the product thermoplastic resin sheet body attained may be characterized by outstanding properties which may be readily controlled. The novel cooling system permits attainment of product sheet which is free of undesirable blemishes or surface defects and is characterized by low orientation and either low or high density as desired for its subsequent use.

It is possible to control the density of the product polymer film by control of the various conditions. For example, in one pair of comparative runs, the density of polypropylene sheet was unexpectedly reduced from 0.892 to 0.887 g/cc. (a significant change is 0.001–0.002 g/cc.) by increasing the water velocity in the secondary zone by a factor of 2.5.

It is also possible to significantly increase the overall rate of heat transfer for cooling the film body to a value of 250 to 400 BTU/hr. ft.$^2$ °F. which is about 140% to 420% greater than that attainable by prior art techniques.

The sheet so prepared may be further treated, as by further cooling, and thereafter used, for example, in vacuum forming processes or it may be subjected to orientation processes, or it may be used in cable wrapping operations.

In accordance with certain of its other aspects, this invention relates to a cooling cell for containing cooling liquid, particularly adapted to cool a thermoplastic sheet body moving therethrough, which may comprise:

a. an upstanding cooling cell container including opposed upstanding outer longer wall portions, a bottom wall portion having an inlet slot therein through which said thermoplastic sheet body may move, and opposed upstanding inner shorter wall portions terminating at their lower ends at said inlet slot and defining therebetween an upstanding secondary cooling zone extending from said inlet slot to an outlet slot at the upper end of said inner shorter wall portions;

b. an upstanding primary cooling zone container, at least a portion of which is surrounded by the upper extremity of said outer longer wall portions of said cooling cell container, including upstanding enclosing wall portions, a bottom wall portion having an exit slit therein through which said thermoplastic sheet body may move, said exit slit being positioned above and co-linear with said outlet slot and defining a relief zone between said outlet slot and said exit slit;

c. means for forming a molten sheet body of thermoplastic resin and for directing it through said upstanding primary cooling zone, said exit slit therein into said relief zone between said primary and said secondary cooling zones, said outlet slot of said secondary cooling zone, said secondary cooling zone, and said inlet slot of said secondary cooling zone;

d. means for passing primary cooling liquid to said primary cooling zone, across the upper free surface thereof as a moving, smooth free surface toward said sheet body, cocurrently therealong, and through said exit slit;

e. means for passing secondary cooling liquid to said inlet slot, through said secondary cooling zone, and through said outlet slot into said relief section;

f. means for passing at least a portion of said secondary cooling liquid against said exit slit thereby controlling the height of the level of cooling liquid in said primary cooling zone;

g. means for withdrawing said sheet body from said inlet slot; and h. means for withdrawing liquid from said cooling cell at a level below the liquid level of said primary cooling zone.

The upstanding cooling cell container which may be used in practice of the process of this invention may include opposed upstanding outer longer wall portions enclosing a liquid discharge zone having a rectangular horizontal cross-section and which commonly may be 0.2 to 0.4 meters, say 0.3 meters broad, 2.0 to 6.0 cm, say 4 cm wider than the sheet width, and 0.21 to 2.5 meters, say 0.65 meters high (parallel to the moving sheet body). There may be an opening or conduit at the lower extremity thereof for withdrawing cooling liquid. Opposed end walls may define the cooling cell. The bottom wall portion may preferably include an inlet slot through which a thermoplastic sheet body may move. Typically, the slot may be 10 to 50 mm, say 25 mm wide and 2 to 6.0 cm, say 4 cm broader than the sheet width.

Affixed to the bottom wall portion may be opposed upstanding inner wall portions which are shorter than the outerwall portions. Typically, the inner wall portions may be 0.2 to 2 meters, say 0.6 meters. The inner wall portions may terminate at their lower ends at the inlet slot and may define an upstanding secondary cooling zone extending from the inlet slot upwardly. The secondary cooling zone terminates, at its upper end, at an outlet slot, which typically may be of the dimensions similar to those of the inlet slot. The inner wall portions of the cooling cell (which define the secondary cooling zone) may bear a plurality of spaced openings through which liquid may flow from the secondary zone. As the openings are opened or closed, the velocity of liquid in the secondary zone may be controlled; and it may be possible to vary the velocity at different levels in the zone.

Adjacent to the inlet slot of the secondary cooling zone, and preferably coterminous with the lower portion of the cooling cell may be a plenum zone through which cooling liquid may be admitted to the secondary cooling liquid zone at a uniform flow across the breadth of the secondary cooling zone. Typically, the walls of the plenum zone may be contiguous with the outer walls of the cooling cell; and the bottom wall of the plenum zone may be spaced 10–30 cm, say 15 cm, from the bottom wall of the cooling cell.

The bottom wall of the plenum zone may bear an outlet seal, typically opposed strips of a flexible resilient composition, such as Teflon, which may be mounted on the bottom wall by a clamping strip. The outlet seal may permit passage therethrough accompanied by little or no cooling liquid.

An upstanding primary cooling zone container, typically 5 to 15 cm, say 12 cm high, 1 to 4 cm, say 2.5 cm wider than the sheet width, and 0.1 to 0.3 meters, say 0.2 meters broad may be mounted in the upper portion of the cooling cell above the outlet slot of the secondary cooling zone. The lower part of the enclosing wall portions and the bottom wall portions of the primary cooling zone may be below the upper extremity of the outer longer wall portions of the cooling cell container.

The bottom wall portion of the primary zone container may contain an exit slit in the control portion thereof. Typically, this slit may be 1 to 4 cm, say 2.5 cm longer than the sheet width and 5 to 30 mm, say 8 mm wider than the sheet thickness. Preferably, it will be aligned with the outlet slot of the secondary zone whereby moving sheet body may readily pass from one to the other and cooling liquid from one may jet against the cooling liquid from the other. Preferably, the closest portions of the exit slit from the primary zone and the outlet slot from the secondary cooling zone may be 0.5 cm to 4 cm, say 1.2 cm apart; and this may be one of the dimensions defining the relief section of the primary zone.

The primary cooling zone containers may include liquid inlets which may, for example, be in the form of sparger openings positioned within a body of packing enclosed within a baffle box to insure uniform quiescent flow. The openings may preferably be in liquid conduits laying in the lower portion (one on each side of the descending sheet body) of the primary cooling zone, directing flow of cooling liquid away from the film body, toward the outer wall portion of the primary cooling zone, then upwardly therealong, and then across the face of said primary zone, as a moving, smooth, free surface. The surface of the cooling liquid may move laterally at a velocity of 1 to 5 fpm, say 2 fpm, which will be sufficient to minimize build-up of any local hot areas and which will maintain the surface free of undesirable turbulence.

DESCRIPTION OF A PREFERRED EMBODIMENT

The novel process of this invention may be carried out in accordance with certain specific embodiments thereof by the technique shown in the drawing which schematically illustrates in cross section one apparatus in which the process may be carried out.

In this embodiment, thermoplastic composition may be extruded through die 10 having outlet 11 having a 60 mil die gap sheet to produce body 12. The sheet body 12 passes through air gap 13 which in this embodiment may be 5 mm high. The molten thermoplastic sheet body 12 may pass to cooling cell generally designated 14. Cooling cell 14 may include a liquid discharge zone generally designated 15, a secondary cooling zone generally designated 16, a primary cooling zone generally designated 17, a relief section generally designated 27 and a plenum zone generally designated 28.

Cooling cell container 14 like primary and secondary cooling zone containers and plenum zone containers may each be preferably bi-sectional, each of the two essentially similar sections being adapted to face upon and to cooperate with one face of sheet body 12.

Cooling cell 14 may include upstanding outer longer walls 19 each having at the upper portion thereof a plurality of vertically spaced openings 20 (which may be stoppered) and an overflow weir 21. In this embodiment, the walls 19 may be 0.675 meters high. Each wall 19 may have therein drain conduit 22 at the lower extremity thereof and these are normally closed. Bottom wall portion 23 may traverse the bottom of the cooling cell 14, and may include an inlet slot 24 which in this embodiment may be 25 mm in total width and 0.65 meters long. Extending upwardly from inlet slot 24 may be upstanding inner shorter wall portions 25 which extend from inlet slot 24, which they may embrace and define, upwardly to outlet slot 26 which may have the same dimensions as inlet slot 24. The upper end of walls 25 may terminate below the upper end of walls 19. Walls 25 may each include seven rows of 12 mm holes, each row equally spaced over the upper half of the wall.

The upper terminating end of walls 25 including outlet slot 26 may define the lower end of the relief section, generally designated 27.

The lower section of the cooling cell 14 includes plenum zone generally designated 28. The plenum zone 28 may be defined by plenum bottom wall 29 having therein a flexible seal 30 supported by support strip 31. Plenum side wall 32 may be 15 cm high and may have cooling liquid inlets 33. Plenum zone 28 may have internal baffles for distribution of liquid entering through inlets 33.

Mounted in cooling cell 14, 12 mm above the upper end of wall 25 may be primary cooling zone containing 17 which includes upstanding enclosing wall portions 34, 12 cm long, and bottom wall portions 35 including exit slit 36 through which the sheet body 12 may pass. The slit 36 may be 9.1 mm in total width and 0.64 meters long. The lower face of wall 35 may be positioned 12 mm above the upper extremity of upstanding wall 25, thus defining relief section 27. The primary cooling cell 17 may contain liquid inlet conduit 37 which may deliver cooling fluid into zone 17 which may contain baffle system 38 which uniformly distributes the flow along the length of zone 17 and directs the flow of liquid upwardly along wall 34 across surface 39.

In practice of one embodiment of the process, crystalline polypropylene having a density of 0.90, a melt flow of about 5–7 and a n-heptane insolubility content of 92% to 95% may be extruded at a rate of 90 pounds per hour (per inch of die width) from extruder 10 operating at 4000 psig and 227°C. The sheet 12 may be 24 inches wide and 60 mils thick. Extruded sheet 12 at 227°C. may leave orifice 11 and pass through air gap 13, which is 5 mm long, at a velocity of 65 fpm.

The molten thermoplastic polypropylene sheet body may pass through moving, smooth, free surface 39 in primary cooling zone 17. Charge primary cooling liquid at 38°C. may be admitted through conduit 37 in amount of 4800 pounds per hour and may move laterally, then upwardly along wall 34 and thence at a velocity of 2 fpm across surface 39 where it may contact sheet body 12. The cooling liquid may flow cocurrently with the sheet body 12; and both may exit primary cell 17 through exit slit 36. At this point, the sheet temperature may be 180°C. at the surface, and 224°C. at the center, i.e. approximately 208°C. average. The exiting cooling liquid may be at temperature of 43°C.

The descending sheet body 12 may pass through the relief section 27 wherein it may be cooled to an average temperature of 206°C. The sheet body 12 may then pass through outlet slot 26 to secondary cooling zone wherein it may be cooled to 38°C. at the surface and 121°C. at the center, i.e. approximately 88°C. average, as it contacts 120,000 pounds per hour of cooling liquid moving countercurrently at a velocity of 200 fpm. Cooling liquid may enter at 4°C. and exit at 5°C.

The cooling liquid leaving outlet slot 26 may pass into relief section 27 wherein it exerts a jet force against exit slit 36 thereby producing a pressure at the outlet of exit slit 36 and thereby controlling liquid level 39.

Downwardly moving sheet passing through secondary cooling zone 16 may exit therefrom, pass through plenum zone 28 wherein it may be cooled an additional 15°C. and thence through outlet seal 30.

Product polypropylene of 40 mil thickness may then pass through an additional cooling step to reduce and equalize its temperature to 40°C. and then readily be recovered at the rate of 100 fpm and subjected to further treatment as desired, for example, biaxial orientation to produce biaxially oriented film product.

Although this invention has been illustrated by reference to specific embodiments, it will be apparent to those skilled in the art that various changes and modifications may be made which clearly fall within the scope of this invention.

What is claimed is:

1. A process for producing a thermoplastic sheet comprising:
   a. extruding a thermoplastic resin in the form of a molten thermoplastic sheet;
   b. passing said sheet through an air gap sized to provide minimum cooling by air; and thereafter
   c. passing said sheet downwardly through a primary cooling zone, entering said zone through an exposed upper surface and exiting said zone through a submerged bottom exit, said zone being characterized by continuous streams of cooling liquid entering said primary zone on both sides of said sheet and directed to flow parallel to said exposed upper surface and toward said entering sheet, whereby said exposed upper surface is moving in laminar flow, said cooling stream passing cocurrently downward in laminar flow adjacent said sheet on both sides thereof and exiting said primary zone along with said sheet; and thereafter
   d. passing said sheet downwardly through a relief zone below said primary zone and contiguous therewith and cooling said sheet therein; and thereafter
   e. passing said sheet downwardly into a secondary cooling zone below said relief zone of (d) and contiguous therewith and further cooling said sheet by countercurrently flowing secondary cooling liquid streams flowing upwardly adjacent both sides of said sheet, said secondary cooling streams entering near the outlet of said sheet from said zone and exiting into said relief zone of (d); and thereafter
   f. withdrawing said primary and secondary liquids from said relief zone at a rate sufficient to maintain a desired fluid depth in said primary zone and to establish the minimum air gap of (b);
   g. withdrawing said cooled sheet from said secondary zone.

2. A process for the production of thermoplastic sheet as claimed in claim 1 wherein said thermoplastic sheet is a polyolefin.

3. A process for the production of thermoplastic sheet as claimed in claim 1 wherein said thermoplastic sheet has a thickness of 10–120 mils.

4. A process for the production of thermoplastic sheet as claimed in claim 1 wherein said thermoplastic sheet is at temperature of 150°C. to 320°C. as it enters said primary zone.

5. A process for the production of thermoplastic sheet as claimed in claim 1 wherein said thermoplastic sheet leaves said primary zone at a temperature 10°C. to 30°C. less than the temperature at which it is admitted to the primary zone.

6. A process for the production of thermoplastic sheet as claimed in claim 1 wherein said thermoplastic sheet as it enters said secondary zone is at temperature of 10°C. to 35°C. less than the thermoplastic sheet temperature leaving the die.

7. A process for the production of thermoplastic sheet as claimed in claim 1 wherein said thermoplastic sheet is at temperature below 150°C. as it leaves said secondary zone.

8. A process for the production of thermoplastic sheet as claimed in claim 1 wherein the velocity of secondary cooling liquid is 50 fpm to 400 fpm in said secondary zone.

9. The process of claim 1 wherein said exposed upper liquid surface is flowing at a velocity between 0.5 and 5 feet per minute.

* * * * *